United States Patent [19]

Hardesty

[11] 4,268,109
[45] May 19, 1981

[54] COUPLER FOR TELEPHONE CORDS

[75] Inventor: Edwin C. Hardesty, Perry Hall, Md.

[73] Assignee: Western Electric Company, Inc., New York, N.Y.

[21] Appl. No.: 81,604

[22] Filed: Oct. 3, 1979

[51] Int. Cl.³ .................. H01R 13/15; H01R 13/514
[52] U.S. Cl. .................................. 339/205; 179/1 PC; 339/156 R
[58] Field of Search .................. 156/580.1; 339/91 R, 339/205, 98, 99 R, 97, 176 M, 176 MF, 17 LC, 156 R, 159 R, 159 P; 179/1 PC

[56] References Cited

U.S. PATENT DOCUMENTS

| 3,117,829 | 1/1964 | Leach | 339/97 |
| 3,474,389 | 10/1969 | Nagano | 339/95 |
| 3,990,764 | 11/1976 | Krumraich | 339/176 M |
| 4,153,327 | 5/1979 | Johnson | 339/205 |
| 4,169,751 | 10/1979 | Yen | 156/580.1 X |

Primary Examiner—Eugene F. Desmond
Attorney, Agent, or Firm—E. W. Somers

[57] ABSTRACT

A coupler (30) for electrically connecting ends of telephone cords which have been terminated with modular plugs (24—24) includes a first portion (31) made of a dielectric material and having a plurality of compartments (45—45) which extend from end to end and which are formed between partitions (41—41), each of which has a centrally disposed bifurcated stem (46). A contact element (42) in the form of a wire having a linear portion (51) and two retroflexed end portions (52—52) is mounted in each compartment with each retroflexed end portion extending between adjacent furcations of the stems. A second portion (32) made of a dielectric material is joined to the first portion and includes an abutment (71) which extends between the furcations (47—47) of the first portion to stabilize the partitions. The second portion cooperates with the first portion to form a pair of back-to-back externally communicating cavities (60—60). Each cavity is adapted to receive a modular plug such that terminals (54—54) of the plug which is inserted into one of the cavities electrically engage associated retroflexed end portions of aligned contact elements between the partitions.

7 Claims, 8 Drawing Figures

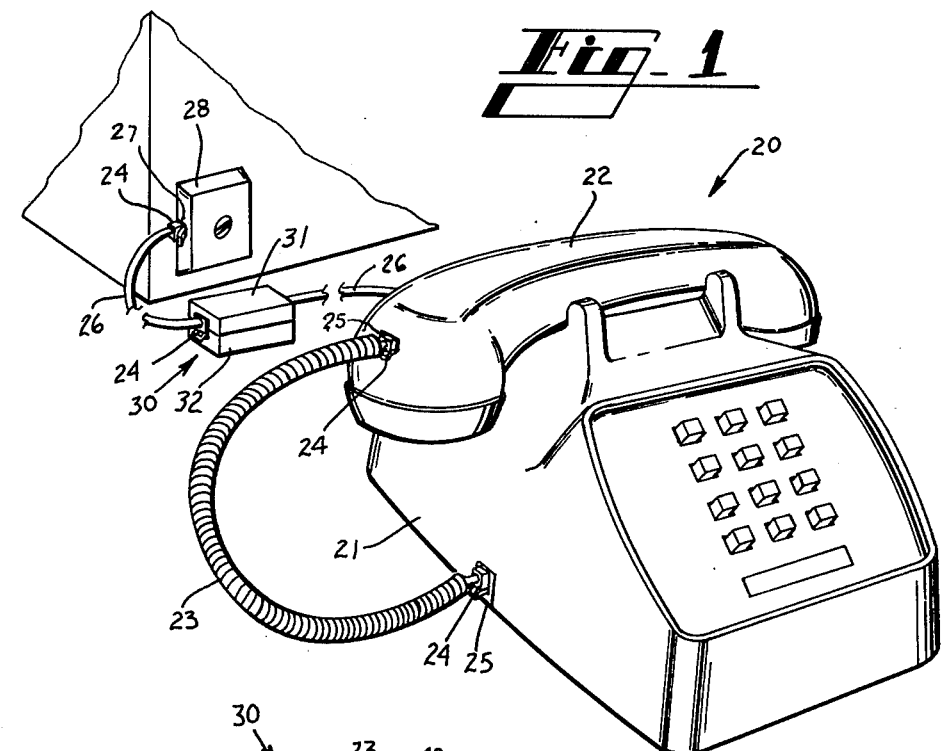
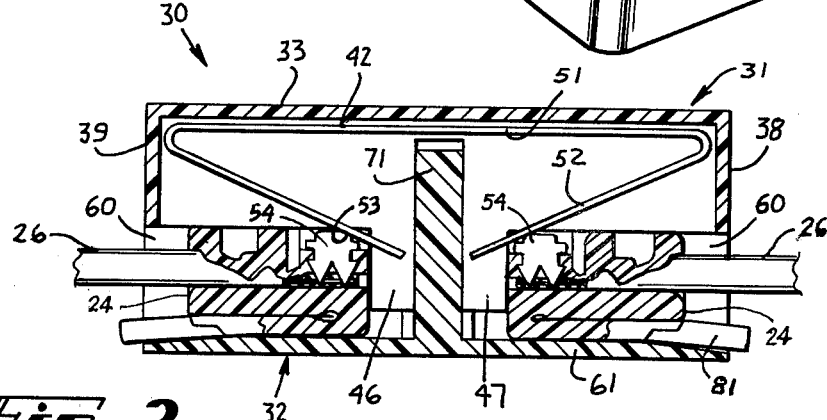
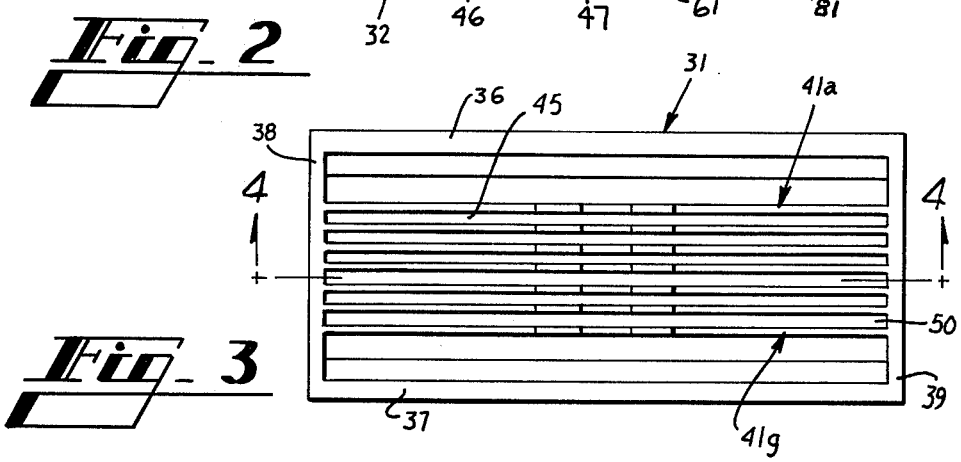

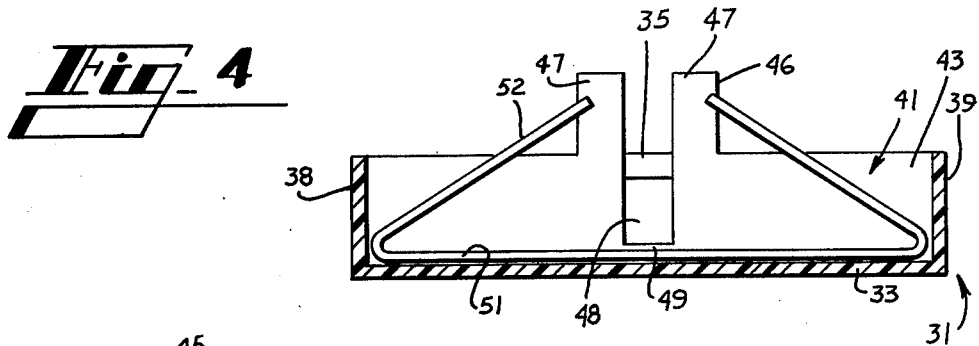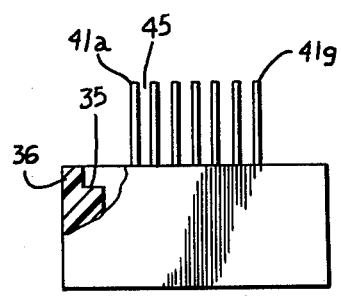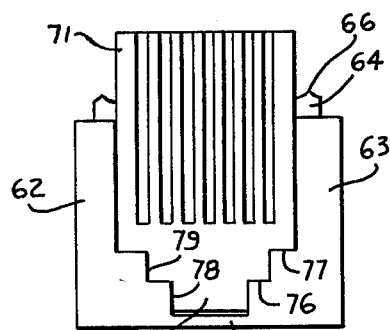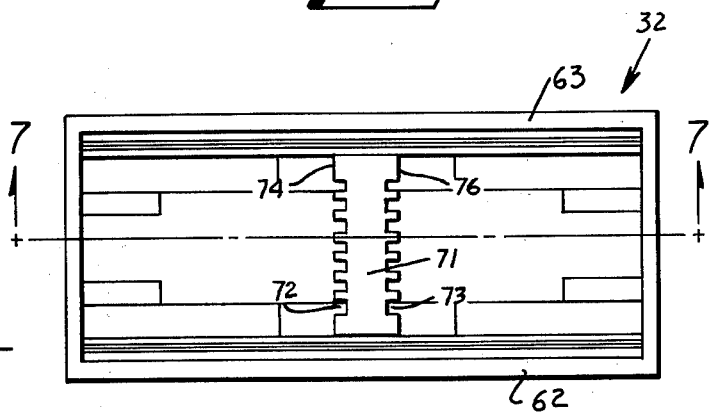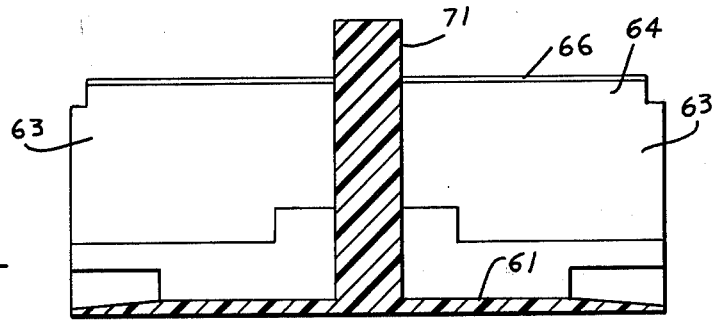

COUPLER FOR TELEPHONE CORDS

TECHNICAL FIELD

This invention relates to a coupler for telephone cords, and, more particularly, to a coupler for connecting electrically one end of a modular plug-terminated telephone cord to one end of another such cord.

BACKGROUND OF THE INVENTION

A present trend in the market of customer telephone station equipment is to provide a miniature or so-called modular jack at a wall outlet and in a base of a telephone set with a miniature, modular plug on each end of a line cord by which the base can be connected to the wall outlet. It is not uncommon to provide a wall jack in any number of rooms of a premises, for example, to render the telephone set very mobile.

This trend has generated a demand for still greater mobility. For example, a customer may wish to place a telephone set at a particular location, but a wall outlet may not be near enough to permit it while using the initially provided line cord. Of course, customers could obtain substantially longer line cords to be able to place their telephone sets at locations remote from the wall outlets. However, if at a later time, a customer wishes to relocate a telephone set at a shorter distance from a wall outlet, an unnecessarily lengthy line cord becomes unsightly.

Customers should welcome the opportunity to be able to easily relocate their telephone sets with customized lengths of line cords being generally equal to the distances of the sets from their associated wall outlets. This capability would be similar to customer ability to place lamps or other electrical power consuming devices at desired locations in rooms and to connect them to remotely located outlets through extension cords.

Seemingly, the prior art is devoid of any device which may be used to satisfy this demand. What is needed is a device which is relatively simple to manufacture and which provides the customer with flexibility in telephone set repositioning for convenience or for purposes of room furniture rearrangements.

SUMMARY OF THE INVENTION

The foregoing requirements are provided by a coupler in accordance with this invention by which available length telephone cords can be quickly and easily connected end-to-end as is necessary in a particular installation. If a wall outlet jack is positioned so that the existing line cord to a proposed telephone set location is of insufficient length, the telephone set is disconnected by removing the modular plug of the line cord from the telephone set base, a coupler of this invention connected to the modular plug, and additional line cords and couplers added thereto in order to achieve the desired length. On the other hand, if the telephone set has been positioned at a location extremely remote from a wall outlet by the use of line cords in combination with a coupler or couplers of this invention, and it is desired to move the set closer to the outlet, line cords are easily removed from the combination until the desired length is obtained.

A coupler for connecting telephone cords which are terminated with modular plugs includes a first portion made of a dielectric material and which has a base with walls upstanding from sides and ends of the base and which has a plurality of spaced partitions that extend from one end to the other and form compartments that have a predetermined spacing. In a preferred embodiment, each partition is T-shaped with a head thereof extending between opposed end walls and with a bifurcated stem extending laterally of the head. A contact element in the form of a wire having a linear portion and retroflexed end portions is received between adjacent partitions so that the wires are mounted at said predetermined spacing. The linear portions of the wire which extend from one end to the other end of the first portion are adjacent the base and they as well as the retroflexed portions of the wires are maintained at the predetermined spacing by the partitions. A second portion made of a dielectric material covers the first portion and cooperates with the first portion to form an externally communicating cavity at each end of the coupler for receiving a modular plug having terminals which engage aligned ones of the wires when the plug is inserted into one of the cavities. The second portion supports the wires between the partitions with their linear portions adjacent the base of the first portion to facilitate the engagement of the end portions of the wires by the terminals of the plugs notwithstanding the orientation of the coupler.

A coupler in accordance with this invention may be used to interconnect plug-terminated line cords which extend between a wall outlet and the telephone set or plug-terminated line cords one or both of which may be connected to a jack end of an extension line cord having a plug at its other end for insertion into a jack of a telephone set or wall outlet.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view in which a line cord from a wall outlet is connected to a line cord from a telephone set through a coupler made in accordance with this invention;

FIG. 2 is a side elevational view partially in section of the coupler with the modular plug of a line cord received in an externally communicating cavity at each end of the coupler;

FIG. 3 is a plan view of an underside of a first portion of the coupler;

FIG. 4 is a side elevational view partially in section of the first portion of the coupler shown in FIG. 3 and taken along lines 4—4 thereof;

FIG. 5 is an end view of the first portion of the coupler;

FIG. 6 is a plan view of a second portion of the coupler which is mateable with the first portion;

FIG. 7 is an elevational view partially in section of the second portion and taken along lines 7—7 in FIG. 6; and FIG. 8 is an end view of the second portion of the coupler.

DETAILED DESCRIPTION

Referring now to FIG. 1, there is shown a telephone set 20 which includes a base 21 and a handset 22 that are interconnected by a retractile cord 23 having a modular plug 24 at each end received in jacks 25-25 in the base and the handset. The modular plug 24 may be that shown, for example, in U.S. Pat. No. 3,860,316 which issued on Jan. 3, 1975 in the name of E. C. Hardesty while the jack may be that shown for example, in U.S. Pat. No. 3,990,764 which issued Nov. 9, 1976 in the name of C. L. Krumreich. A single line cord 26 having a modular plug 24 at each end connects the base 21 to a wall outlet 28 by inserting the plugs into jacks 27-27 in the base and in the wall outlet.

An occasion may arise when a customer wishes to position the telephone set 20 in a location farther from the wall outlet 28 than the present location of the telephone set. The new location, which indeed could be in another room, may require a line cord 26 having a length which is greater than any one of several conventionally manufactured lengths or a customer may wish to move his telephone apparatus 20 to a location closer to a wall outlet 28 without using an unnecessarily lengthy line cord 26 which could well be unsightly.

This problem is overcome by removing one end of the line cord 28 from the jack 25 in the telephone set 20 and inserting it into one end of a coupler 30 which is made in accordance with this invention. A plug 24 at one end of another line cord 26, which in combination with the other line cord will provide a suitable length, is inserted into the coupler 30 to connect the base 21 of the set 20 in its new location to the wall outlet 28. Of course, if the distance from the wall outlet 28 to the set 20 demands it, additional line cords 26-26 and couplers 30-30 may be used. Moreover, with longer runs, the use of couplers 30-30 in accordance with this invention permits the optional combination of tinsel cords with stranded wire cords, for example, having a lowered resistance, which could avoid the reduction of signal strength and preserve the quality of service.

As can be seen in FIG. 2, the coupler 30 includes a first portion, designated generally by the numeral 31, a second portion designated generally by the numeral 32, and a plurality of contact elements 42-42. The first portion 31 and the second portion 32 are made from a dielectric material such as, for example, polycarbonate. The first and second portions 31 and 32 are joined together by any of several well known techniques to form the coupler 30 which essentially comprises a pair of back-to-back jacks which function in the same manner as the wall jacks or the jacks in the telephone set.

Turning now to FIGS. 3-5, the first portion 31 includes a base 33 having opposed side walls 36 and 37 and opposed end walls 38 and 39 upstanding therefrom. Each of the side walls 36 and 37 is stepped to form a ledge 35 which cooperates with an associated portion of the second portion 32 in a manner to be described hereinafter to facilitate the joining of the first portion 31 and the second portion.

The first portion 31 also includes a plurality of partitions 41-41 which form compartments 45-45 therebetween for receiving contact elements in the form of wires 42-42. Each of the partitions 41-41, which are made integrally with the first portion 31, is generally T-shaped and includes a head portion 43 which extends from one end wall 38 to the opposite end wall 39. Each partition 41 also includes a stem portion 46 extending laterally from the head portion 43 and bifurcated to form two spaced furcations 47-47 having a channel 48 formed therebetween (see FIG. 4). It should be observed that the channel 48 extends well into the head portion 43 and is spaced from the base 33 by a reduced height section of the head 43 which is referred to as a web 49.

In a preferred embodiment, the portion 31 includes seven partitions 41-41, designated 41a-41g to form six contact-element compartments 45-45. The clearance between each two adjacent partitions 41-41 is the width of a compartment 45 and is slightly larger than the diameter of a contact element 42. Also of importance is the thickness of each partition; it must be such that the center-to-center spacing of the contact elements 42-42 is equal to that of terminals in a modular plug. The outermost partitions 41a and 41g are spaced from the side walls 36 and 37 by a distance which is greater than, but which may be the same as, the clearance between adjacent ones of the partitions. It is within the scope of this invention to construct the first portion 31 with five partitions in which the clearance between the outer partitions and the walls 36 and 37 is equal to that between the partitions.

In the assembly of a coupler 30, one of the contact elements 42-42, which may be made of a material such as, Phosphor bronze, for example, is positioned within each of the compartments 45-45 formed by the partitions 41-41 to assume the position shown in FIG. 4. Still referring to FIG. 4, each of the contact elements 42-42 is seen to include an elongated portion 51 which extends generally from end wall 38 to the end wall 39 and also a pair of retroflexed end portions 52-52 which angle up toward the bifurcated stem portions 47-47 of the partitions 41-41. The elongated portion 51 of each wire-like contact element 42 is received between adjacent head portions 43-43 of the partitions 41-41, but the outside diameter of each wire is such that it does not extend above the web 49. The contact-elements 42-42 are destined to be engaged by crown portions 53-53 of blade-like terminals 54-54 (see FIG. 2) of a modular plug 24 which is capable of being received into each end of the coupler 30.

An advantage of the coupler 30 is its use of uninsulated wires 42-42 as contact elements which interconnect aligned terminals 54-54 of the plugs 24-24 which are inserted into opposite ends of the coupler 30. If insulated wires were used, the spacing between their centers would exceed that of the terminals 54-54 and additional facilities would be required to connect the wires to the terminals. The use of uninsulated wires is possible because the partitions 41-41 form individual compartments and provide an effective dielectric barrier between adjacent contact elements and results in a coupler width between the walls 33-34 which is less than that if insulated conductors were used.

Viewing now FIGS. 6-8, there is shown the second portion 32 which cooperates with the first portion 31 to form end-to-end externally communicating jack cavities 60-60 for receiving modular plugs 24-24. The second portion 32 includes a base 61 having two side walls 62 and 63 extending therefrom. Each of the walls 62 and 63 has a rail 64 extending therealong with an energy director 66 formed thereon. When the second portion 32 is assembled to the first portion 31, the rails 64-64 engage the ledges 35-35 so that upon the application of ultrasonic energy, for example, the two portions are joined together through the energy directors 66-66 which melt and fuse the parts together.

For purposes of assembly and subsequent stability of portions of the coupler, the base 61 is formed with a centrally disposed abutment 71 which is upstanding from the base and which has a plurality of parallel grooves 72-72 and 73-73 formed in side surfaces 74 and 76 thereof. In the assembly of the first and the second portions 31 and 32, the abutment 71 is moved into the channel 48 between the bifurcated stem portions 47-47 of each of the partitions 41-41 with an edge portion of each of the bifurcated portions 47-47 being received within one of the grooves 72-72 and 73-73. The reception of the abutment 71 in the channel 48 causes the first and second portions 31 and 32 to become aligned so that they may be joined in proper relation. This assembly stabilizes the upstanding stem portions 46-46 of the partitions 41-41 as well as stiffens the midsection of the coupler 30. It should be observed from FIG. 2 that the abutment 71 is spaced slightly from the web 49 so that a precise fit and possible problem with respect to assembly are avoided. Advantageously, the abutment 71 also functions to provide a dielectric barrier between free ends of the contact elements 42-42 which are moved toward each other when the end portions 52-52 of the wires are depressed by the crown portions of the blades 54-54 as the plugs 24-24 are inserted into the cavities 60-60.

It should be apparent from a study of FIG. 2 that the abutment 71 functions to retain the contact elements 42-42 within the compartments 45-45 notwithstanding the orientation of the coupler 30 such as, for example, that shown in FIG. 2. With the coupler 30 oriented as shown in FIG. 2 and not in use, i.e. plugs 24-24 not inserted in cavities 60-60, the abutment 71 prevents the dropping of the contact elements 42-42 since the end portions 52-52 thereof are no longer supported by the crown portions of the terminals 54-54 of the plugs.

In an end view of the second portion 32 shown in FIG. 8, it is seen that the abutment 71 extends between the two side walls 62 and 63. Also, it can be seen that the base 61 is joined to the side walls through a plurality of steps 76-76 and 77-77 with vertical portions 78-78 and 79-79. The steps 76-76 and 77-77 advantageously cause the externally communicating cavities 60-60 at the ends of the coupler 30 to conform to the external end configuration of the modular plugs 24-24 which are to be received in the openings. This end configuration of a modular plug 24 is shown, for example, in hereinbefore-identified E. C. Hardesty Pat. No. 3,860,316 and includes a latching clip 81 (see FIG. 2) that is received in an opening 82 (see FIG. 3) when the plug is inserted into a cavity 60.

It is to be understood that the above-described arrangements are simply illustrative of the invention. Other arrangements may be devised by those skilled in the art which will embody the principles of the invention and fall within the spirit and scope thereof.

What is claimed is:

1. A coupler for connecting telephone cords, which are terminated with modular plugs, said coupler comprising:

a first portion which is made of a dielectric material and which includes a base and opposed walls upstanding from sides and ends of said base, said first portion having a plurality of partitions that extend from one end to the other and form compartments that have a predetermined spacing, each of said partitions including a stem portion extending away from said base;

wire-like contact elements positioned between adjacent partitions, each said contact element having a linear portion which is adjacent to said base of said first portion and having retroflexed free end portions, said linear and said retroflexed portions of each said contact element being maintained at said predetermined spacing by said partitions; and a second portion which is mateable with, which covers, and which cooperates with said first portion to form an externally communicating cavity at each end of the coupler for receiving a plug having terminals mounted therein at said predetermined spacing that engage said contact elements, said second portion including means for supporting said stem portions of said partitions in said first portion at said predetermined spacing to maintain said retroflexed portions of said contact elements at said predetermined spacing to facilitate their engagement by terminals of plugs which are inserted into said cavities and for maintaining said linear portions of said contact elements adjacent to said base of said first portion.

2. The coupler of claim 1, wherein each of said partitions is T-shaped with a head thereof extending between opposed end walls of said first portion and with said stem portion extending laterally of the head, said retroflexed end portions of said contact elements being confined between said stem portions.

3. The coupler of claim 2, wherein said stem portion of each of said partitions of said first portion is bifurcated, and said second portion includes side walls and a centrally disposed abutment which extends between the side walls of the second portion and which is formed with a plurality of spaced grooves in opposed sides thereof, said abutment being received between the furcations of the stem portions of the first portion when the first and second portions are mated with said furcations of said stem portions of the partitions being received in opposed ones of the grooves of said abutment.

4. The coupler of claim 3, wherein said second portion is formed with a base and side walls, said abutment upstanding from said base centrally of ends of said base, said side walls being stepped to provide openings between opposed stepped portions of said side walls of said second portion to receive a plug having terminals which engage said contact elements.

5. The coupler of claim 4, wherein said side walls of said second portion are formed with longitudinally extending energy directors, and said side walls of said first portion have an inwardly facing ledge formed thereon, said energy directors adapted to engage said ledges when said first and second portions are mated to permit bonding energy to be directed through said directors and cause said directors to bond together said first and second portions.

6. The coupler of claim 3, wherein a channel is formed between furcations of each partition and extends toward said base and into said head of each partition of said first portion but is spaced from said base of said first portion by a web, the mating of said first and second portions causing said abutment of said second portion to be spaced from said web of each partition.

7. The coupler of claim 6, wherein each said contact element is constructed of a wire having a circular cross-section and said web is such that its height above said base of said first portion is greater than the outside diameter of said linear portion of each contact element, said abutment which extends toward said web being effective to maintain each said contact element positioned in its compartment with the linear portion adjacent the base of the first portion and the free end portions between said furcations notwithstanding the orientation of said coupler.

* * * * *